(12) United States Patent
Diez et al.

(10) Patent No.: US 6,899,853 B1
(45) Date of Patent: May 31, 2005

(54) EXHAUST GAS PURIFICATION SYSTEM

(75) Inventors: Rainer Diez, Nagold (DE); Frank Bühler, Nagold-Iselshausen (DE); Andraes Dietsche, München (DE)

(73) Assignee: Boysen GmbH & Co. KG, Altensteig (DE)

( * ) Notice: Subject to any disclaimer, the term of this patent is extended or adjusted under 35 U.S.C. 154(b) by 771 days.

(21) Appl. No.: 09/675,931

(22) Filed: Sep. 29, 2000

(30) Foreign Application Priority Data

Mar. 31, 2000 (DE) ..................................... 200 06 032 U

(51) Int. Cl.[7] ............................................. B01D 53/34
(52) U.S. Cl. ...................... 422/179; 422/177; 422/180
(58) Field of Search ............................. 422/171, 177, 422/179, 180, 211, 222

(56) References Cited

U.S. PATENT DOCUMENTS

| | | | | |
|---|---|---|---|---|
| 4,335,077 A | * | 6/1982 | Santiago et al. ............ | 422/179 |
| 5,190,732 A | * | 3/1993 | Maus et al. .................. | 422/179 |
| 5,293,743 A | * | 3/1994 | Usleman et al. ............. | 60/299 |
| 5,419,876 A | * | 5/1995 | Usui et al. .................. | 422/177 |
| 6,162,403 A | * | 12/2000 | Foster et al. ................ | 422/173 |

FOREIGN PATENT DOCUMENTS

DE    41 22 287 A1    1/1992

* cited by examiner

*Primary Examiner*—Hien Tran
(74) *Attorney, Agent, or Firm*—Fitch, Even, Tabin & Flannery

(57) ABSTRACT

An exhaust gas purification system, in particular for motor vehicles, having at least one catalyst body (6) which is arranged in a housing (1) and which has an in particular honeycomb-like metal matrix (8) as a substrate for the active catalyst material and a jacket (10), also made of metal, surrounding the matrix (8) and attached thereto in particular by soldering, via which the catalyst body (6) is fixedly connected, in particular welded, to the housing (1), wherein the catalyst body (6) is only fixedly connected to the housing (1) at one point (16), in particular at its downstream end region

11 Claims, 3 Drawing Sheets

EXHAUST GAS PURIFICATION SYSTEM

The present invention relates to an exhaust gas purification system, in particular for motor vehicles, having at least one catalyst body which is arranged in a housing and which has an in particular honeycomb-like metal matrix as a substrate for the active catalyst material and a jacket, also made of metal, surrounding the matrix and attached thereto in particular by soldering, via which the catalyst body is fixedly connected, in particular welded, to the housing.

The metal jacket around the matrix is required in such exhaust gas purification systems as the matrix with the active catalyst material is not of stable shape alone. In particular with underhood metal catalysts, the problem can arise that stresses occur between the jacket and the matrix, by means of which the matrix can detach from the jacket. These stresses occur due to the thermal stress and the uneven heating of jacket and matrix.

It is the object of the invention to provide an exhaust gas purification system of the kind first named which is improved in this respect over known exhaust gas purification systems. In particular, the stresses between the jacket and the matrix of the catalyst body and so the risk of detachment of the two from one another should be reduced.

This object is satisfied in that the catalyst body is only fixedly connected to the housing at one point, in particular at its downstream end region.

As a result of the fixed connection of the catalyst body to the housing at only one point, it is achieved that the jacket can expand with the matrix. As a result of the connection at only one side, the jacket is supported in the housing in a floating-like manner and can follow the thermal expansion movement of the matrix which heats up faster due to the direct contact with the exhaust gas. Stresses between the jacket and the matrix of the catalyst body are thereby reduced. This counters the detachment of the matrix from the jacket.

The jacket of the catalyst body is preferably surrounded by a gas space in communication with the exhaust gas flow, but not itself flowed through. The contact between the exhaust gas and the jacket of the catalyst body is improved by this design so that the jacket heats up faster. The thus reduced temperature differences between the jacket and the matrix result in a further reduction in stresses.

In accordance with a preferred embodiment of the invention, the catalyst body is arranged inside an inner pipe fixedly connected to the housing and, in turn, fixedly connected to the inner pipe. As a result, the jacket has no support function, with the exception of the matrix, and can thus be made with a reduced thickness. The thickness of the jacket can, for example, be reduced from 1.5 mm to approximately 1 mm or lower. To allow the thickness of the jacket to be reduced even further, a welded ring can be provided which grips round the jacket in the fastening region.

In accordance with a further embodiment of the invention, the inner pipe is spaced from the housing to form an insulation gap. The outside temperature of the exhaust gas purification system can be reduced and the heating up of the catalyst body accelerated in this way in a manner known as such.

In accordance with a further embodiment of the invention, the catalyst body is spaced from the inner pipe to form the gas space. The gas space to cause exhaust gas to flow over the jacket of the catalyst body is provided in a constructionally simple manner in this way.

The gas space is closed in particular at its downstream end, and its upstream end is in communication with the exhaust gas flow. The exhaust gas is thus led directly into the gas space so that the fast warming up of the jacket is ensured in an especially good manner.

In accordance with a special embodiment of the invention, the inner pipe is designed as a prolongation of an inlet pipe piece or an outlet pipe piece provided in the housing. A separate inner pipe can thus be saved and the directing of the exhaust gas is especially easy.

In accordance with a further embodiment of the invention, the inner pipe protrudes over the catalyst body at least at one side. It can thus be used advantageously in this way for communication with an adjacent exhaust gas directing element.

In accordance with another embodiment of the invention, the jacket is connected to the housing or the inner pipe via an intermediate pipe piece. This allows a welded joint to be made from the outside between the jacket of the catalyst body and the housing or the inner pipe. The matrix of the catalyst body is thus protected against welding splashes.

It is particularly preferred if the intermediate pipe piece engages into the inner pipe and is connected to the jacket with one end and protrudes over the associated end of the inner pipe and is connected to the inner pipe with the other end. A welded joint can thus also be made from the outside between the inner pipe and the intermediate pipe piece so that the matrix is again also protected from welding splashes.

In accordance with a further embodiment of the invention, which is also claimed independently, the jacket protrudes over the matrix at least at one side. A welded joint to fasten the catalyst body to the housing can thereby advantageously be provided in a region in which no matrix is present, The risk of destroying the matrix during the welding process can thereby be reduced. In addition, the intermediate pipe piece can advantageously engage into the protruding section of the jacket.

In a special embodiment of the invention, two catalyst bodies are arranged behind one another and at least the front catalyst body is fixedly connected to the housing only at one point. It has been found that it can be sufficient for only the front catalyst body to be supported in a floating manner, as the temperature stress of the rear catalyst body and so the stresses occurring there are much lower due to the gas dynamics and the flow distribution. If only the front catalyst body is supported in a floating manner, the exhaust gas purification system can be simplified in construction.

In accordance with embodiments of the invention, the inner pipe, the intermediate pipe piece or the jacket of the front catalyst body can be led to the rear catalyst body and be connected to the jacket of the rear catalyst body for the flow communication between the front catalyst body and the rear catalyst body. It is preferred if the inner pipe, the intermediate pipe piece or the jacket of the front catalyst body engage into a protruding section of the jacket of the rear catalyst body. A welded joint can thereby also be introduced at a region in which no matrix is present and thereby the risk of the matrix being destroyed by the welding process can be reduced.

The jacket and the matrix and, preferably, also the welded joints between the jacket and the housing, the inner pipe and/or the intermediate pipe piece and/or between the jacket of the first catalyst body and the jacket of the second catalyst body are preferably made of the same material. The thermal expansion values of the different elements can thereby be matched to one another and so stresses reduced.

BRIEF DESCRIPTION OF THE DRAWINGS

Exemplary embodiments of the invention are shown in the drawing and described below. There are shown, in each case in schematic representation.

DETAILED DESCRIPTION OF THE PREFERRED EMBODIMENTS

Figure 1:
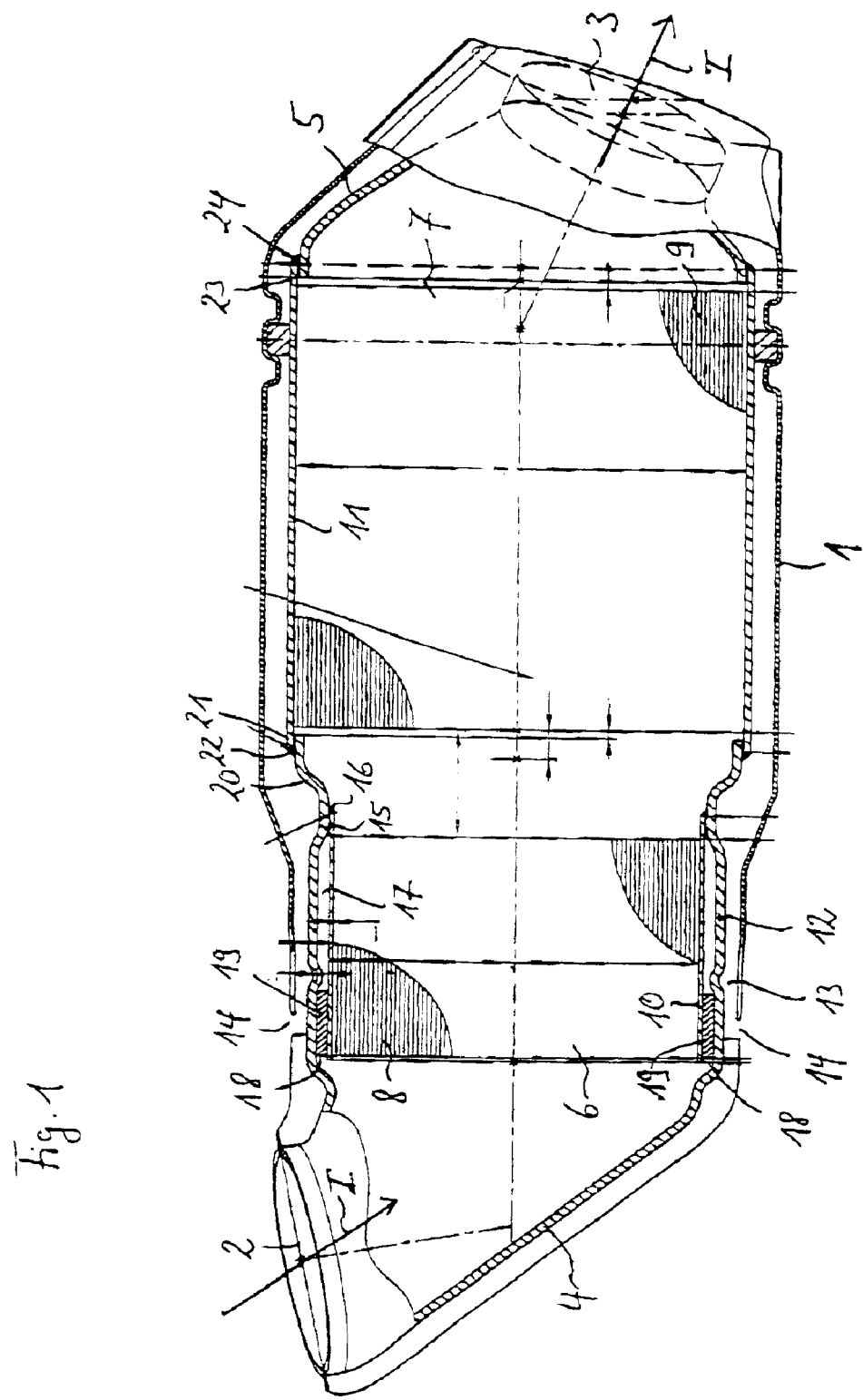
FIG. 1 a longitudinal section through a first variant of the exhaust gas purification system in accordance with the invention.

The exhaust gas purification system shown in FIG. 1 comprises a housing 1, in particular formed from two half-shells, having an exhaust gas inlet aperture 2 and an exhaust gas outlet aperture 3. The exhaust gas inlet aperture 2 is formed by an inlet funnel 4; the exhaust gas outlet aperture 3 by an outlet funnel 5.

Two catalyst bodies 6 and 7, namely a pre-catalyst 6 and a main catalyst 7, are arranged behind one another in the housing 1 in the direction of flow 1. The catalyst bodies 6 and 7 each comprise a metal matrix 8, 9 formed like a honeycomb as the substrate for the catalyst material and a jacket 10, 11, also made of metal, preferably of the same metal as the matrix, enclosing the matrix 8, 9.

The catalyst body 6 is arranged in a tubular section 12 which connects to the inlet funnel 4 and is made as one piece therewith, The tubular section 12 is spaced from the housing 1 so that an insulation gap 13 is formed between the tubular section 12 and the housing 1. As can be seen, the insulation gap 13 is open towards the outer space via apertures 14.

The jacket 10 of the catalyst body 6 protrudes over the matrix 8 at its downstream end. The jacket 10 and the tubular section 12 of the inlet funnel 4 contact one another in this section protruding over the matrix 8. The jacket 10 is connected tightly and fixedly to the tubular section 12 via a peripheral welded joint 16. The welded joint preferably consists of the same material as the jacket 10 and the matrix 8.

The remaining part of the jacket 10, in contrast, is spaced from the tubular section 12 of the inlet funnel 4. This is achieved by the tubular section 12 having a diameter enlarged with respect to the section 15 in this region. In this way, a gas space 17 is created between the jacket 10 of the catalyst body 6 and the tubular section 12 of the inlet funnel 4, said gas space 17 being closed at is downstream end. The upstream end of the gas space 17, however, is in communication with the inside of the inlet funnel 4, and so with the exhaust flow, via an annular aperture 18. The upstream end of the catalyst body 6 is furthermore supported with respect to the tubular section 12 by a plurality of spacers 19 which are arranged spread over the periphery of the catalyst body 6 and which can preferably be burned off in the operation of the exhaust gas purification system. The assembly of the catalyst body 6 is made easier m this way. However, the spacers 19 can also be omitted. Furthermore, it is possible to provide one or more wire cushions enclosing the jacket 10 in full or in part instead of the spacers 19.

The downstream end of the tubular section 12 of the inlet funnel 4 protrudes over the catalyst body 6 and is flared in diameter to form an intermediate funnel 20 in the exhaust gas flow direction I. The intermediate funnel 20 engages to fit into a protruding section 21 of the jacket 11 of the second catalyst body 7 and is tightly connected thereto by a peripheral weld 22. The jacket 11 also shows a protrusion 23 at its downstream end into which the outlet funnel 5 engages to fit, The outlet funnel 5 is tightly connected to the protruding section 23 of the jacket 11 via a peripheral weld 24. The jacket 11 of the second catalyst body 7 thus has a supporting function, while the jacket 10 of the first catalyst body 6 has no supporting function, with the exception of the matrix 8. The supporting function is rather taken over by the tubular section 12 of the inlet funnel 4, The welded joints 22 and 24 also preferably consist of the same material as the jacket 11 and the matrix 9.

The matrix 8 and the matrix 9 are in each case soldered to the jacket 10 and the jacket 11 respectively. The soldering can be provided practically over the whole region of the matrix 8 by the arrangement of the weld 16 of the catalyst body 6 in the region of the protrusion 15 of the jacket 10. A soldering is preferred in particular in the upstream end region of the matrix 8. The soldering can also be provided in the catalyst body 7 approximately over the whole matrix 9 as the welded joints 22 and 24 of the jacket 11 are also provided in protruding sections 21, 23 of the jacket 11. However, the soldering is provided in particular in the middle region of the matrix 9 due to the welding of the jacket 11 on both sides.

Figure 2:
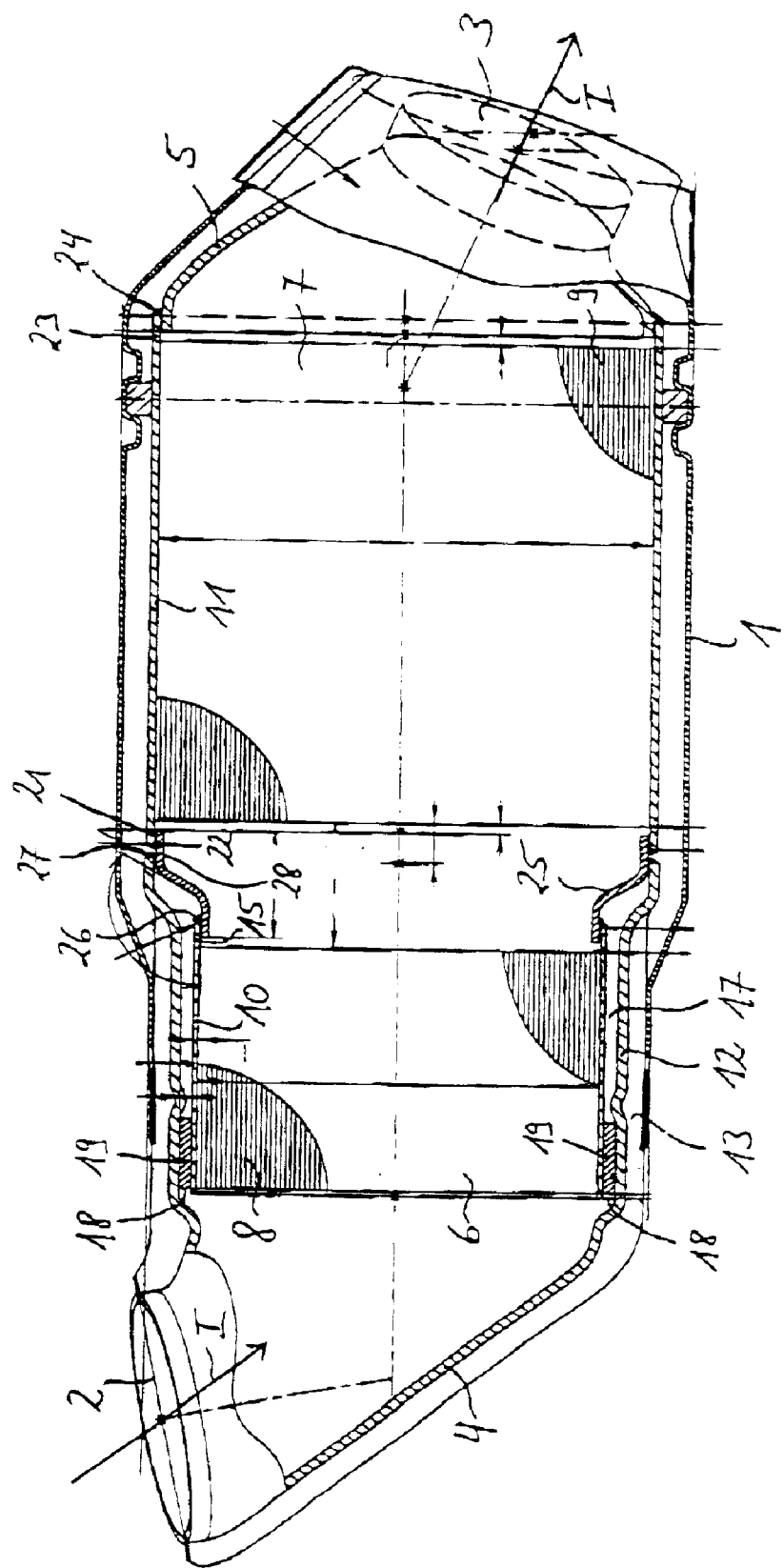
FIG. 2 a longitudinal section through a second variant of the exhaust gas purification system in accordance with the invention, and FIG. 3 a longitudinal section through a third variant of the exhaust gas purification system in accordance with the invention.

The exhaust gas purification system shown in FIG. 2 largely agrees with the exhaust gas purification system of FIG. 1. The main difference is that here the catalyst body 6 is in communication with the tubular section 12 of the inlet funnel 4 via a separate intermediate pipe piece 25. The intermediate pipe piece 25, which is formed as an intermediate funnel due to the flaring of its diameter in the direction of exhaust gas flow I, engages with its upstream end into the protruding section 15 of the jacket 10 and contacts this from the inside. The welded joint 26 between the jacket 10 of the catalyst body 6 and the intermediate pipe piece 25 can thereby be provided on the outside of the jacket 10 and the intermediate pipe piece 25 so that the matrix 8 is protected against weld splashing during the making of the welded joint 26.

The downstream end of the intermediate pipe piece 25 contacts the tubular section 12 of the inlet funnel 4 from the inside, but protrudes over its downstream end. A welded joint 27 can thereby also be made from the outside between the intermediate pipe piece 25 and the tubular section 12 of the inlet funnel 4. The protruding section 28 of the intermediate pipe piece 25 now engages to fit into the protruding section 21 of the jacket 11 of the second catalyst body 7 and is tightly connected thereto via a welded joint 22. In all other respects, the two exhaust gas purification systems are in agreement with one another.

Figure 3:
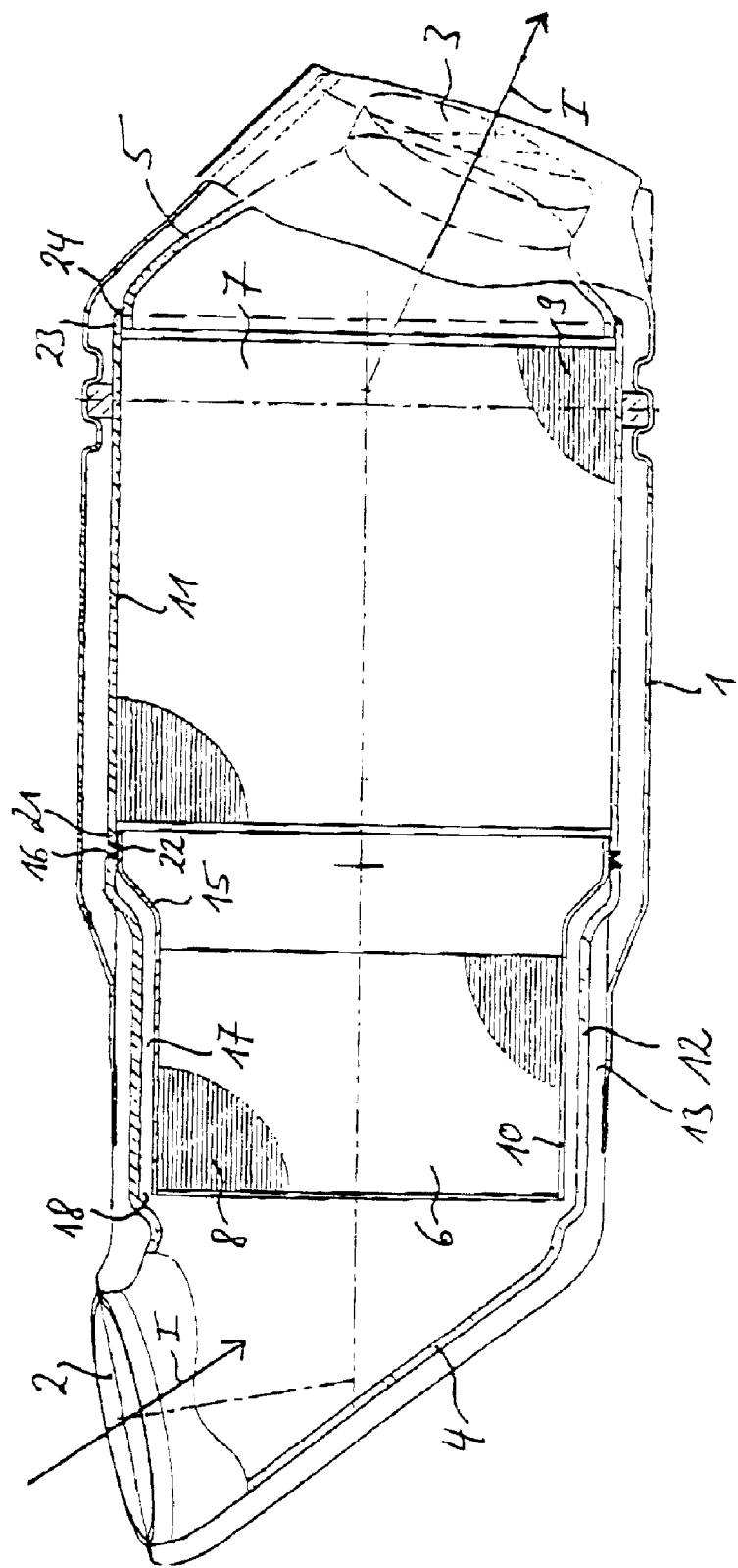

The variant of FIG. 3 is also largely in agreement with the two variants described above. The difference is substantially that in the variant of FIG. 3, the jacket 10 of the first catalyst body 6 is extended up to the second catalyst body 7 and its extended section 15 engages into the protruding section 21 of the jacket 11 of the second catalyst body 7. The flow communication is now effected only by the jacket 10 of the first catalyst body. This achieves a further simplification in construction. Another difference between the variant of FIG. 3 and the two previously described variants is that in the variant of FIG. 3, no spacers are present between the catalyst body 6 and the tubular section 12.

The risk of detachment of the matrix 8 from the jacket 10 of the catalyst body 6 is reduced by the embodiment in accordance with the invention of the exhaust gas purification system. This is achieved in a simple constructive manner by the catalyst body 6 being supported in a floating manner in the tubular section 12 of the inlet funnel 4 and being fixedly connected to said tubular section only at one side. Despite the different heating-up, the jacket 10 can thereby expand with the matrix 8 so that the stresses occurring between the jacket 10 and the matrix 8 are reduced. A further reduction in the stresses results from the fact that the jacket 10 is flowed over by exhaust gas via the gas space 17 so that its warming up is less behind that of the matrix 8. This can also be promoted by the thickness of the jacket 10 being reduced as much as possible, for example to 1 mm. This is made possibly by the jacket 10 exercising no supporting function, with the exception of the matrix 8.

Reference Numeral List

1 Housing
2 Inlet aperture
3 Outlet aperture
4 Inlet funnel
5 Outlet funnel
6 First catalyst body
7 Second catalyst body
8 Matrix of 6
9 Matrix of 7
10 Jacket of 6
11 Jacket of 7
12 Tubular section
13 Insulation gap
14 Aperture
15 Section of 10
16 Weld
17 Gas space
18 Annular aperture
19 Spacer
20 Intermediate funnel
21 Section of 11
22 Weld
23 Section of 11
24 Weld
25 Intermediate pipe piece
26 Weld
27 Weld
28 Section of 25
I exhaust gas flow direction

What is claimed is:

1. An exhaust gas purification system comprising at least one catalyst body which is arranged in a housing assembly and which has a honeycomb metal matrix as a substrate for active catalyst material and a jacket of metal, surrounding the matrix and attached thereto via which the catalyst body is fixedly connected to the housing assembly only at one point at its downstream end region, the catalyst body being arranged inside an inner pipe of the housing assembly fixedly connected to an outer housing of the housing assembly and the catalyst body, in turn, being fixedly connected to the inner pipe, the catalyst body being spaced from the inner pipe to form a gas space, the gas space being closed at its downstream end, and its upstream end being in communication with the exhaust gas flow.

2. An exhaust gas purification system in accordance with claim 1, characterized in that the inner pipe is spaced from the outer housing to form an insulation gap.

3. An exhaust gas purification system in accordance with claim 1, characterized in that the inner pipe is an extension of an inlet pipe piece or an outlet pipe piece provided in the housing assembly.

4. An exhaust gas purification system in accordance with claim 1, characterized in that the inner pipe protrudes over the catalyst body at least at one side.

5. An exhaust gas purification system in accordance with claim 1, characterized in that the jacket is connected to the inner pipe via an intermediate pipe piece.

6. An exhaust gas purification system in accordance with claim 5, characterized in that the intermediate pipe piece engages with its one end into the inner pipe and is connected to the jacket and protrudes with its other end over the associated end of the inner pipe and is connected to the inner pipe.

7. An exhaust gas purification system in accordance with claim 1, characterized in that the jacket of the catalyst body protrudes beyond the matrix at least at one side to form a protruding section and the fixed connection is at the protruding section.

8. An exhaust gas purification system in accordance with claim 1, characterized in that two catalyst bodies including jackets thereof are arranged behind one another in the direction of exhaust gas flow and in that at least the front catalyst body is only fixedly connected to the housing assembly at one point.

9. An exhaust gas purification system in accordance with claim 8, characterized in that the jacket of the front catalyst body is extended up to the rear catalyst body and is connected to the jacket of the rear catalyst body.

10. An exhaust gas purification system in accordance with claim 9, characterized in that the jacket of the front catalyst body engages into a protruding section of the jacket of the rear catalyst body.

11. An exhaust gas purification system in accordance with claim 1, characterized in that a welded joint fixedly connects the catalyst body to the inner pipe, and the jacket, the matrix and the welded joint are of the same material.

* * * * *